Figure 1:
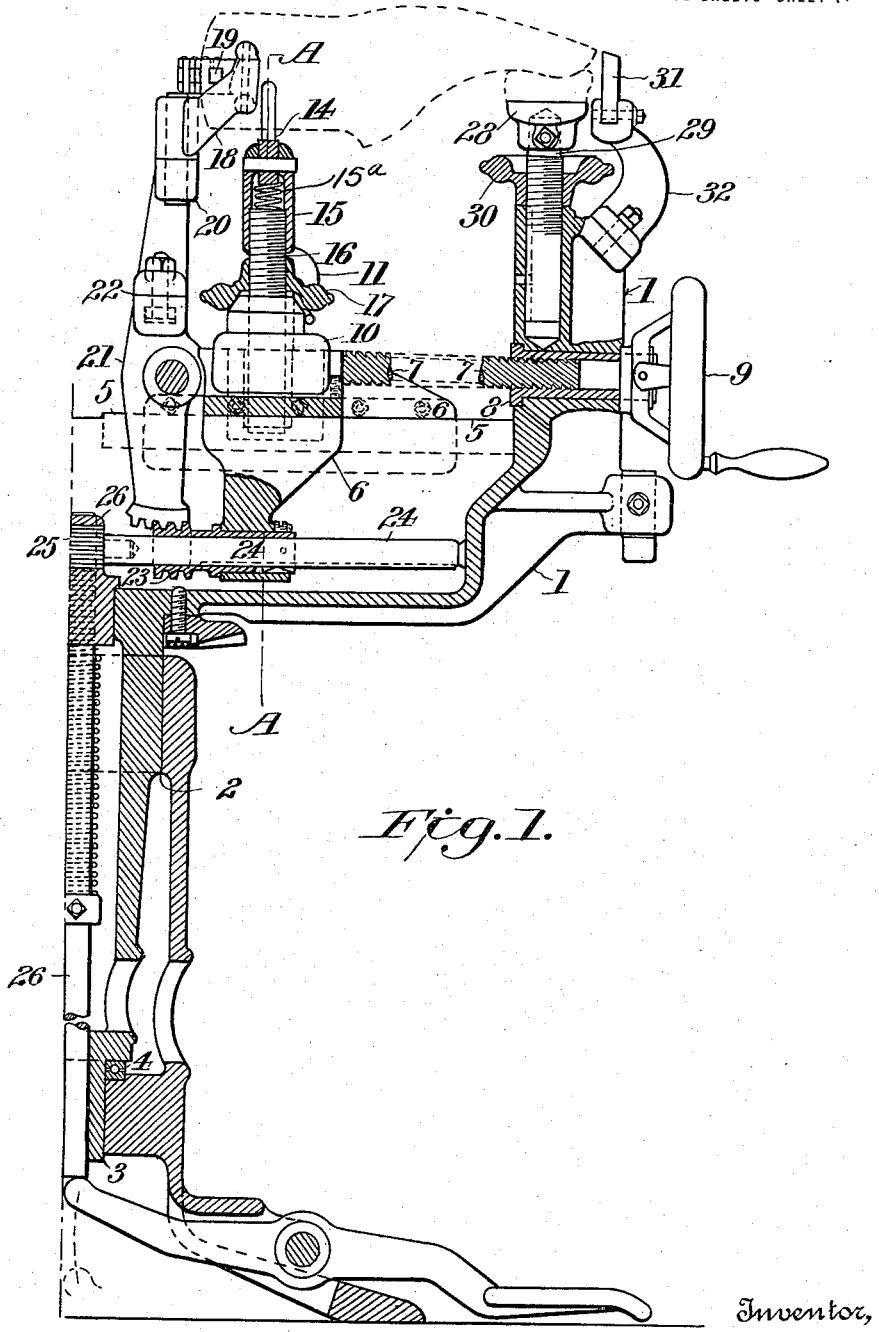

M. T. DENNE.
SOLE LEVELING MACHINE.
APPLICATION FILED AUG. 1, 1910.

1,176,740.

Patented Mar. 28, 1916.
12 SHEETS—SHEET 2.

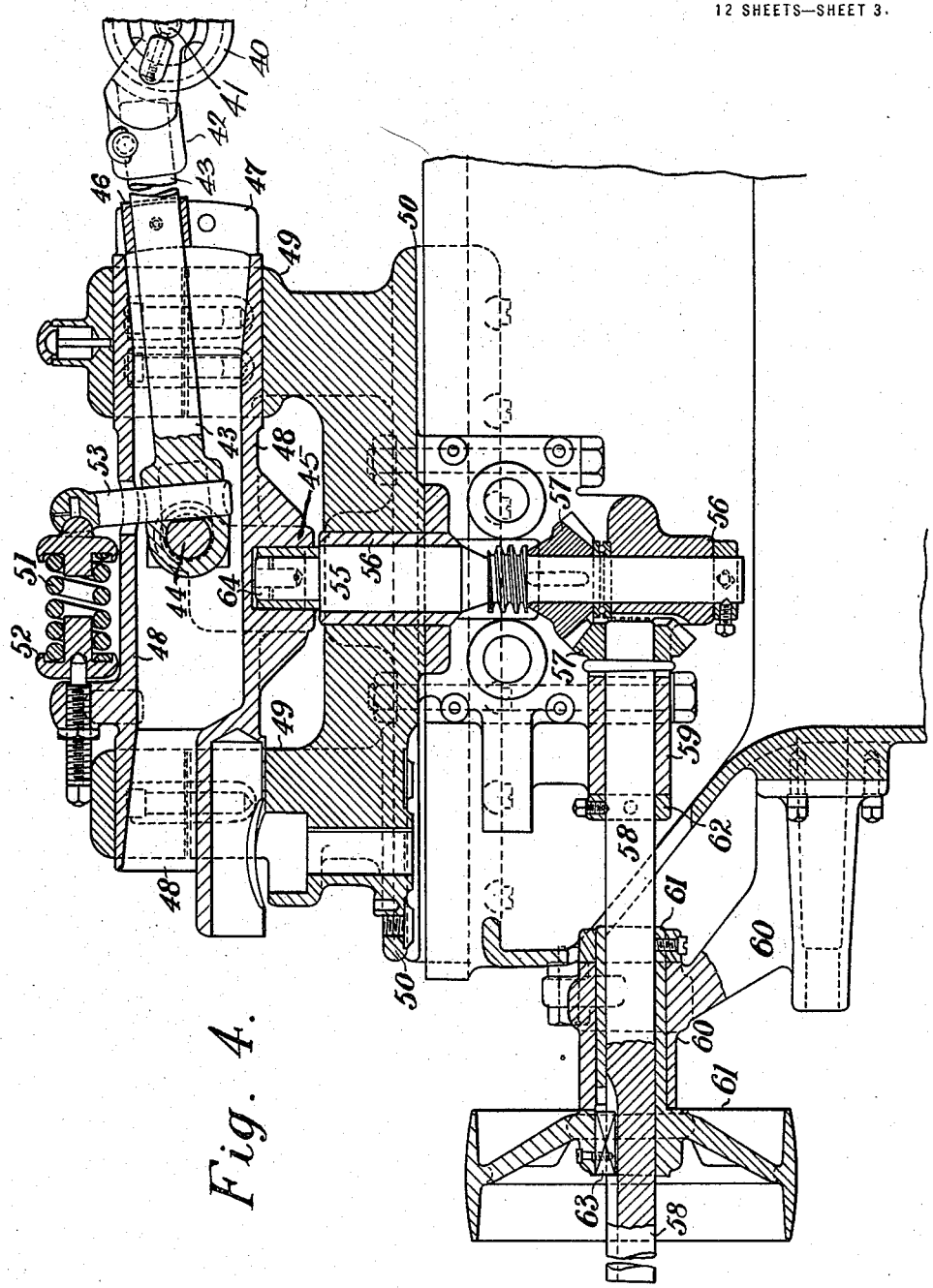

M. T. DENNE.
SOLE LEVELING MACHINE.
APPLICATION FILED AUG. 1, 1910.
1,176,740.
Patented Mar. 28, 1916.
12 SHEETS—SHEET 4.
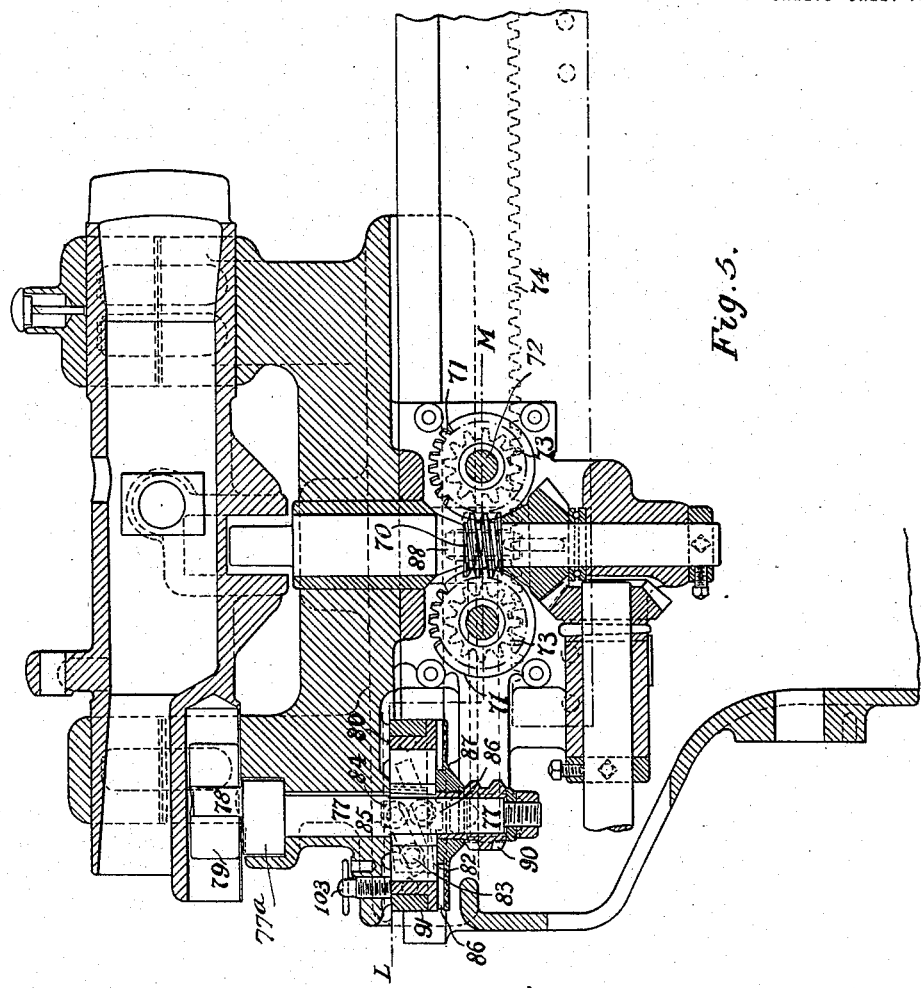
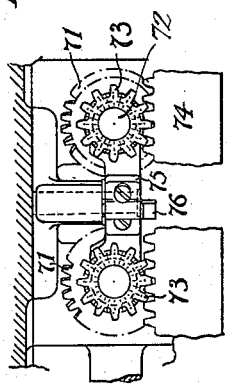
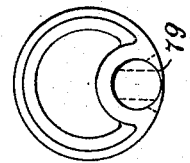

M. T. DENNE.
SOLE LEVELING MACHINE.
APPLICATION FILED AUG. 1, 1910.
1,176,740.
Patented Mar. 28, 1916.
12 SHEETS—SHEET 5.
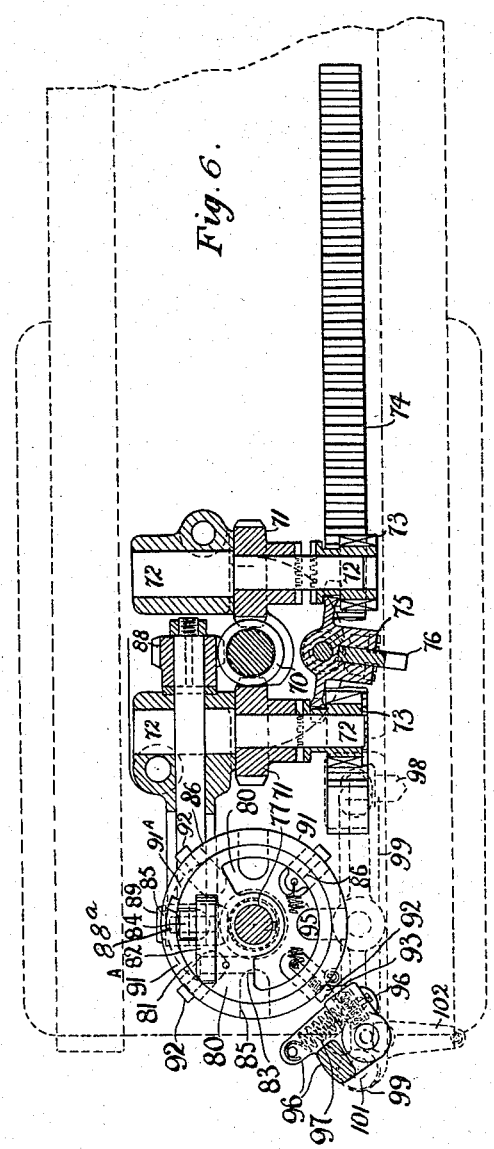
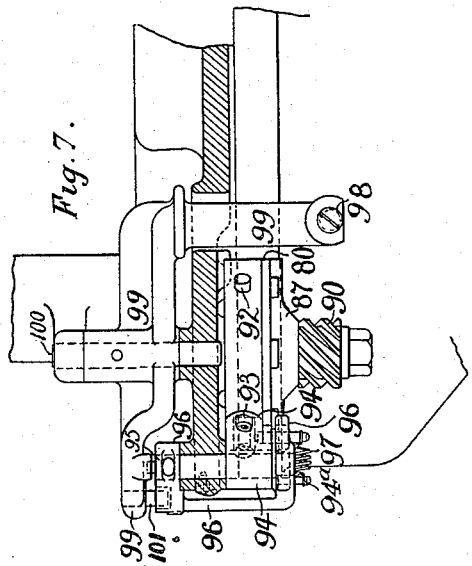

M. T. DENNE.
SOLE LEVELING MACHINE.
APPLICATION FILED AUG. 1, 1910.

1,176,740.

Patented Mar. 28, 1916.
12 SHEETS—SHEET 6.

M. T. DENNE.
SOLE LEVELING MACHINE.
APPLICATION FILED AUG. 1, 1910.

1,176,740.

Patented Mar. 28, 1916.
12 SHEETS—SHEET 8.

M. T. DENNE.
SOLE LEVELING MACHINE.
APPLICATION FILED AUG. 1, 1910.

1,176,740.

Patented Mar. 28, 1916.
12 SHEETS—SHEET 9.

M. T. DENNE.
SOLE LEVELING MACHINE.
APPLICATION FILED AUG. 1, 1910.
1,176,740.
Patented Mar. 28, 1916.
12 SHEETS—SHEET 10.
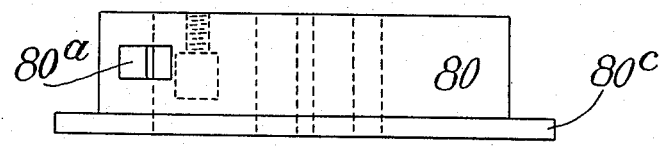
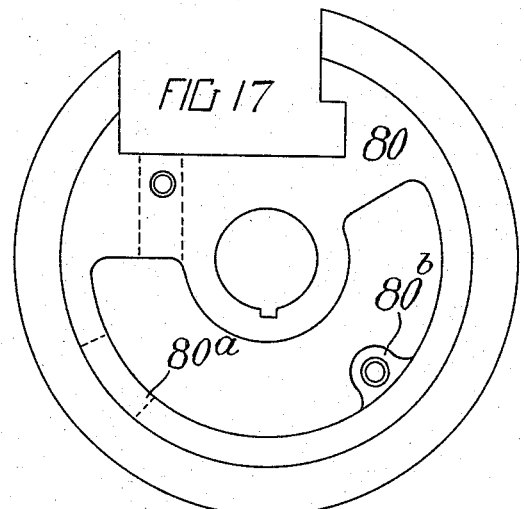
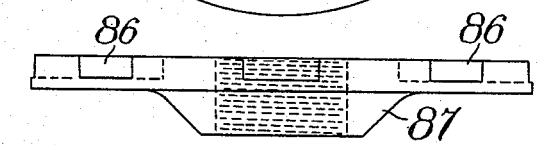
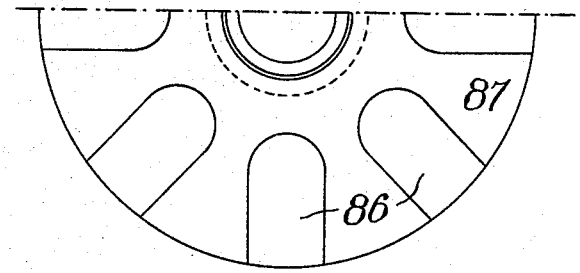

M. T. DENNE.
SOLE LEVELING MACHINE.
APPLICATION FILED AUG. 1, 1910.
1,176,740.
Patented Mar. 28, 1916.
12 SHEETS—SHEET 11.
FIG 20
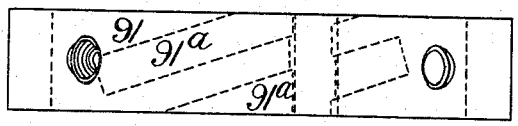
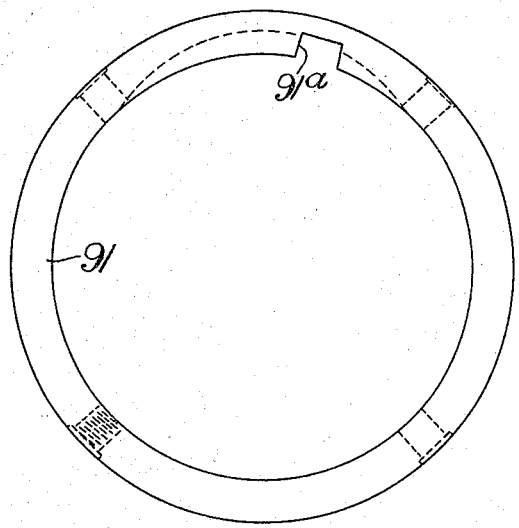
FIG 21
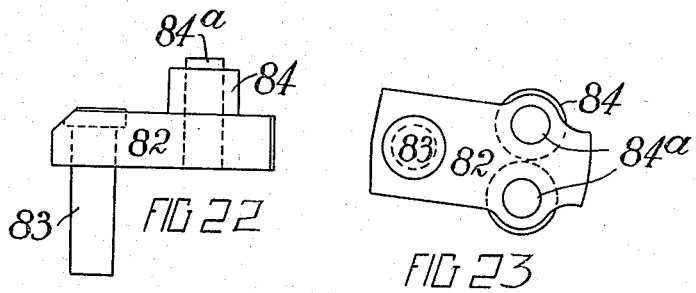
FIG 22
FIG 23

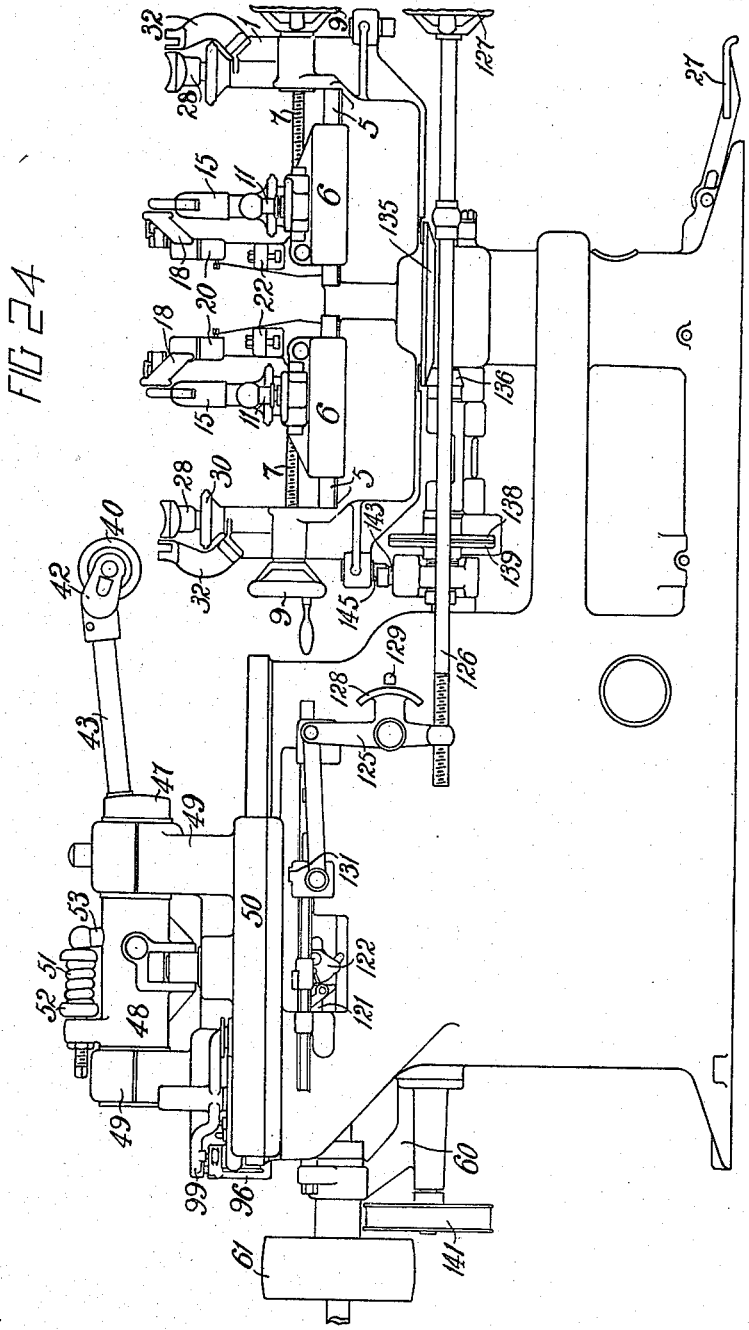

UNITED STATES PATENT OFFICE.

MARK THOMAS DENNE, OF RUSHDEN, ENGLAND.

SOLE-LEVELING MACHINE.

1,176,740.  Specification of Letters Patent.  Patented Mar. 28, 1916.

Application filed August 1, 1910. Serial No. 575,011.

*To all whom it may concern:*

Be it known that I, MARK THOMAS DENNE, a subject of the King of Great Britain and Ireland, residing at Rushden, Northamptonshire, England, have invented new and useful Improvements in Sole-Leveling Machines to be Used in the Manufacture of Boots and Shoes, of which the following is a specification.

This invention has reference to improvements in sole leveling machines to be used in the manufacture of boots and shoes and one of its main objects is to enable three kinds of boots or shoes to be automatically leveled on a machine having a single leveling roller, viz.: (1) those in which one side only of the waist portion of the boot is to be leveled at an angle compared with the surface of the sole at the forepart; (2) those in which both sides of the waist portion are to be leveled at an angle to the surface of the sole at the forepart; and (3) those in which the whole of the leveling of the forepart and waist portion is to be in one plane, the means for adapting or adjusting the machine for automatically leveling any one of the said classes of boots or shoes to be under the control of the operator.

Another object of my invention is to provide a sole leveling machine having a single leveling roller with automatically operating means to so control said roller that the leveling of alternate right and left boots or shoes in which one side only of the waist portion (usually the inside) is to be leveled at an angle as compared with the sole at the forepart may be automatically effected.

Although a single last support may be employed with my improved machine it is known to be advantageous to employ a plurality of such supports and I propose to provide a sole leveling machine having a single leveling roller with a plurality of last carrying jacks and means operated by the machine whereby the last carrying jacks are successively moved into and out of position to be operated on by the leveling roller.

I also provide means to support the boot or shoe on the jack to prevent undue strain of the last pin and its thimble.

To these ends my invention consists in a machine wherein a single leveling roller is made to travel backward and forward over the sole and having automatically operating means whereby when the machine is operating on one boot or shoe the leveling roller may be made to tilt to one side at the desired time and will continue for a predetermined distance to operate in its tilted position on the boot or shoe and will then be made to resume the original position in which to complete the leveling operation, these various operations being repeated while the next succeeding boot or shoe is operated on with the important exception that the automatic means will cause the tilting of the roller to be to the other side while the roller is operating on the sole. The means whereby such automatic tilting is brought about are capable of adjustment by the operator, so that he may set the machine so that the leveling roller after it has leveled one side of the waist at an angle will be made to automatically move or tilt in such a way that it will then level the other side of the waist at an angle and after having accomplished this will automatically resume its original position to complete the operation of leveling. The means for bringing about this automatic tilting to one side or successively to both sides of the waist portion of the boot may be thrown out of operation, so that the leveling roller will operate in one plane only; the means for effecting this being useful also to effect the reversing in the tilt of the roller should that be desirable.

I also provide a heel clamp for securely holding the work and which clamp is put out of its operative position by depressing a treadle and into operation by releasing such treadle.

While I do not restrict myself to the particular means hereinafter to be described with reference to the accompanying drawings for attaining the above and other objects to be pointed out I will now proceed to describe a suitable construction of machine whereby the said objects may be attained.

Figure 2:
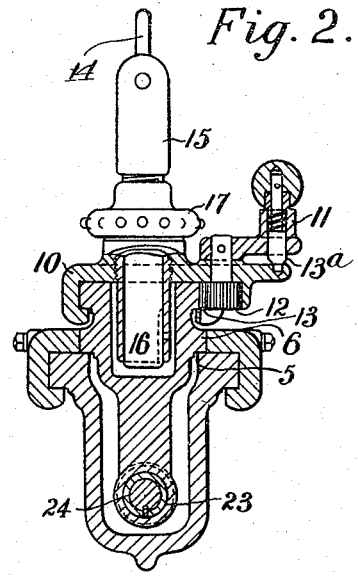
Figure 3:
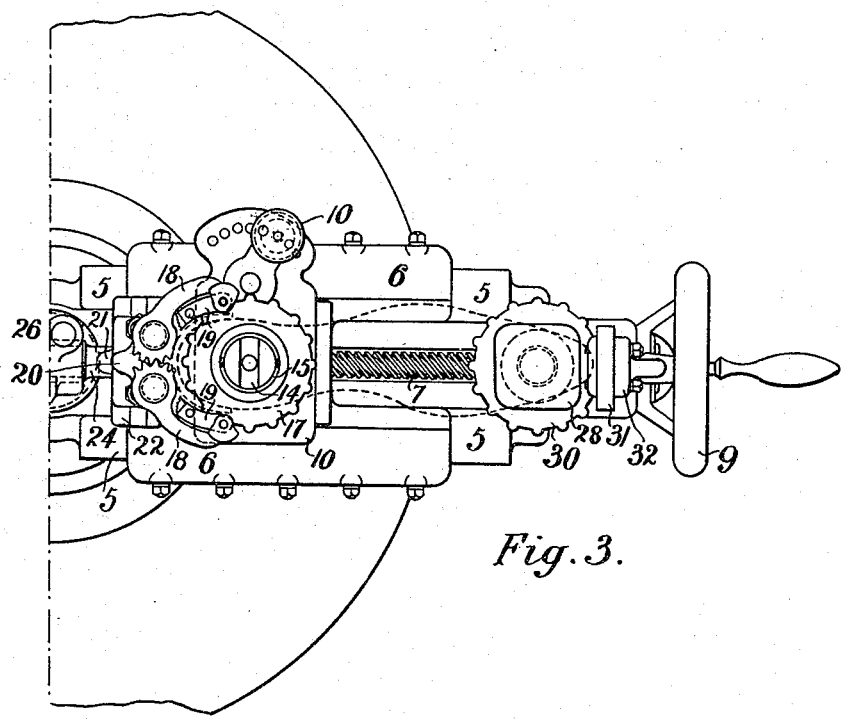
Figure 10:
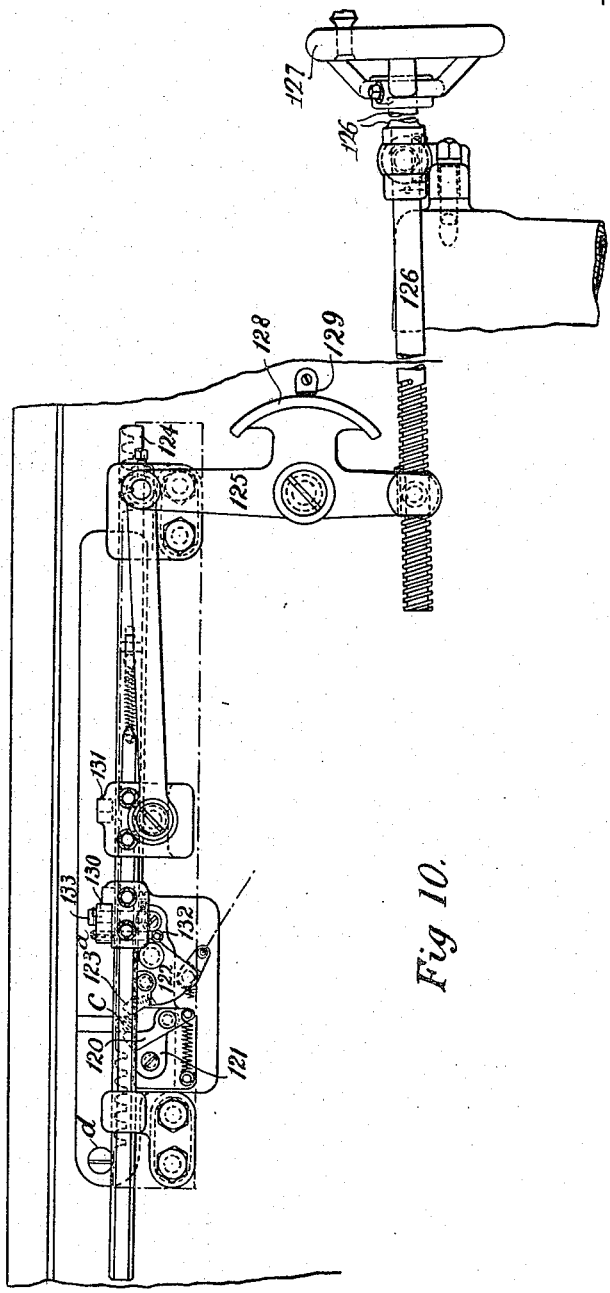
Figure 11:
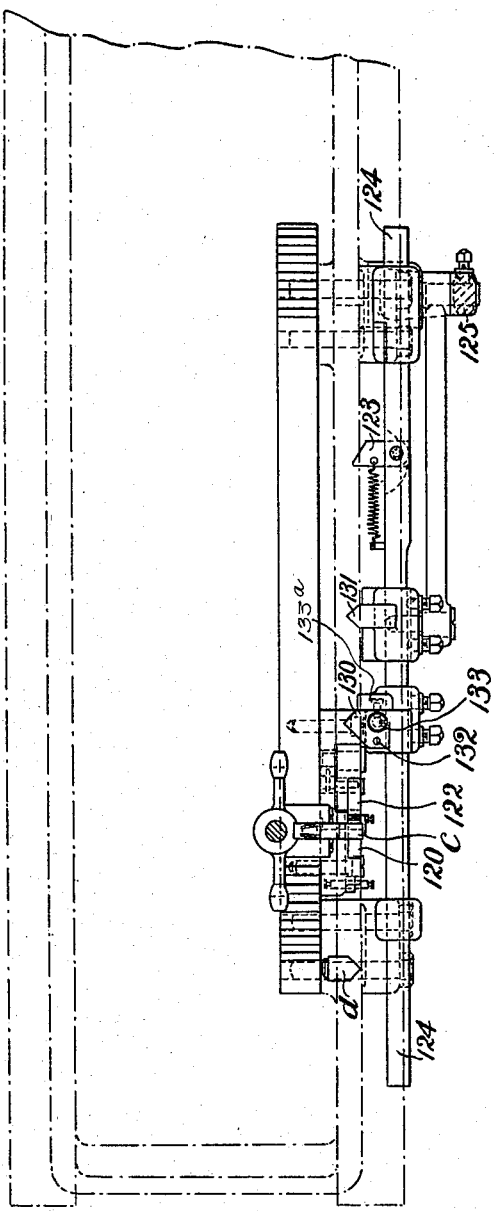
Figure 12:
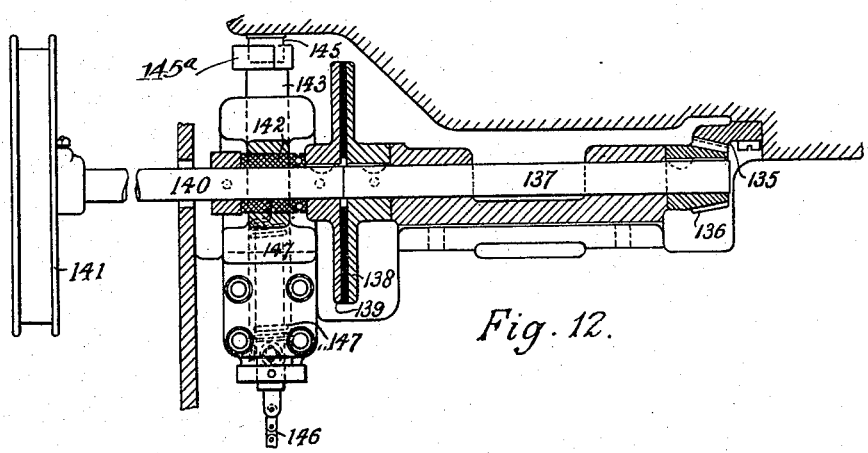
Figure 13:
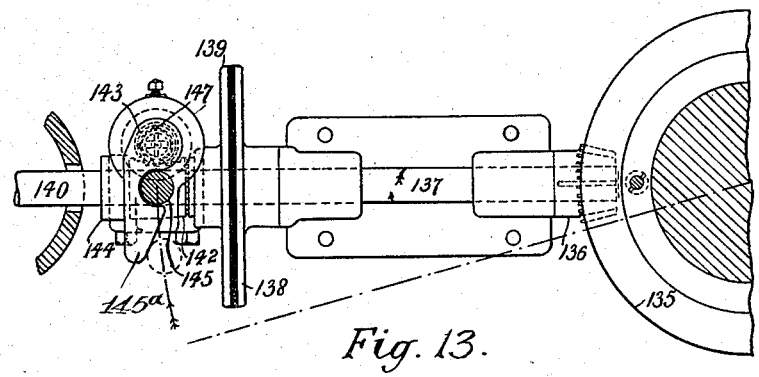
Figure 14:
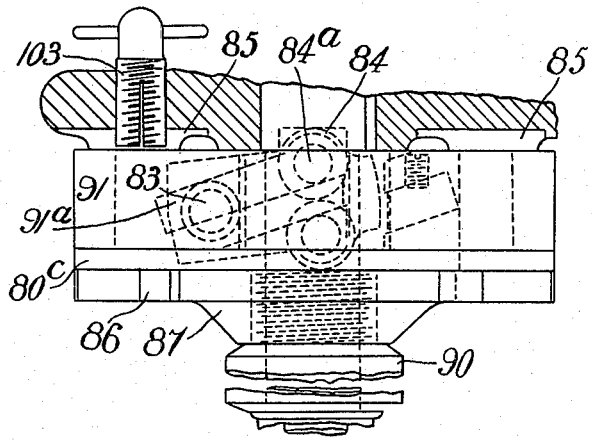
Figure 15:
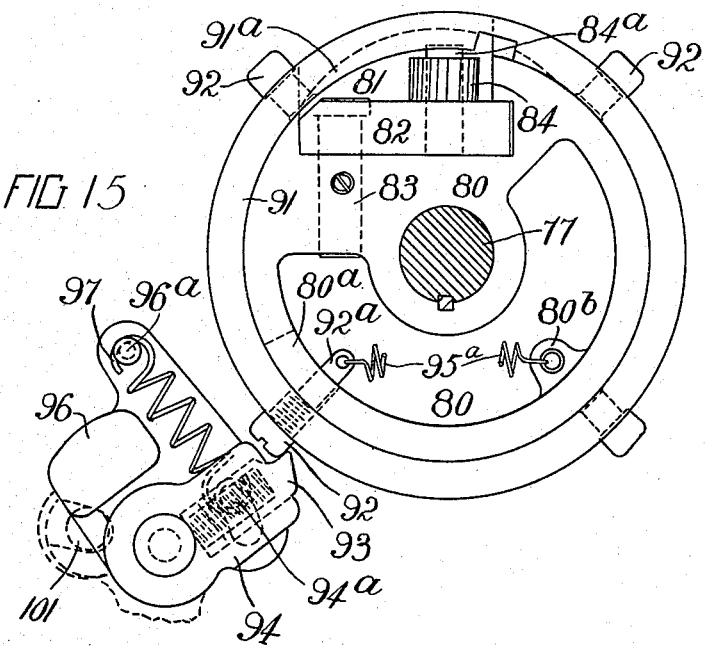

Referring to the accompanying drawings:—Figure 1 is a side elevation—partly in section—of one half of the jack carrying table. Fig. 2 is a section on line A—A Fig. 1. Fig. 3 is a plan view of Fig. 1. Fig. 4 is a sectional side elevation of the main drive and the means whereby vibratory movement is imparted to the leveling tool or roller. Fig. 5 is a sectional side elevation showing the trunk vibrating and tilting mechanism and the means whereby forward and backward movements are imparted to the carriage. Fig. 6 is a plan—partly in section—of portions of the mechanism for reciprocating the carriage and tilting the roller. Fig. 7 is a side elevation of the trip lever and mechanism for controlling the tilting motion escapement. Fig. 8 is a side elevation of the gears and their switch lever whereby motion is imparted to the carriage. Fig. 9 is an end view of the trunk and its fitting whereby tilting of the trunk is effected. Figs. 10 and 11 are side elevation and plan respectively of the hand operated means for changing the length of travel of the carriage. Figs. 12 and 13 are a sectional side elevation and a plan view respectively of the means for imparting rotary motion to the jack carrying table. Figs. 14 and 15 are a side elevation and plan respectively on a larger scale of the means for tilting the roller; and Figs. 16 to 23 are detail views of the block or disk and coöperating parts shown on the left of Fig. 6, removed from the machine. Fig. 24 shows a side elevation of the complete machine.

In said drawings, the numeral 1 (Fig. 1) indicates a rotatable table having a central column fitting in vertical bearings at 2, 3 in the front portion of the frame, and supported on a ball thrust ring 4. Said table is provided with an upper bearing surface or slide 5, radiating from the axis of rotation of the table, upon which slides a carriage 6 which is adapted to be moved to and fro to accommodate different sizes of boots or shoes. It is moved by means of a high pitch screw 7 and nut 8 revolved by handwheel 9. Slidable on and in the same direction as said carriage 6 is a second movable carriage 10 the position of which on the carriage 6 is controlled and may be regulated by a hand lever 11 mounted on the spindle of a pinion 12 which gears with a rack 13 at one side of the carriage 6. The lever is set in position by a spring bolt 13ª. The object of this adjustability of the carriage 10 on the carriage 6 is to enable the position of the last-pin to be adjusted with respect to the heel clamp (to be afterward described) as it is found that the pin hole in different lasts varies in position to a considerable extent.

The last pin is formed on a block 14 pivoted to a tube 15 and controlled by a spring 15ª so that it is normally upright but will yield laterally when the last is moved under the influence of the heel clamp to be described. The object of this is to take the strain off the last pin and the thimble in the wood last—which are not properly suitable for the purpose.

The tube 15 is secured on a screw threaded bar 16 sliding vertically in a fitting in the carriage 10 a handwheel 17 on the part 16 serving to move it vertically to allow it to be adjusted to different heights of lasts.

18 indicates heel clamp levers which carry a chain 19 and are geared together so that when the chain is pressed against the heel of the shoe they automatically close and grip it. This construction also prevents any possibility of the clamps yielding sidewise under pressure and avoids undue strain being put on the last pin and its thimble. The levers 18 are pivoted on a support 20 bolted in an adjustable manner to an arm 21 which is mounted on a spindle carried in bearings on the carriage 6. The upper part 20 may be adjusted horizontally at 22 to suit different lasts.

The lower end of the arm 21 is made as a segment gearing with a worm 23 mounted on a spline shaft 24 in such a manner that it must rotate with it but is free to slide thereon. The spline shaft has a pinion 25 at its end gearing with a rack cut in a bar 26 sliding vertically in bearings in the trunk of the table 1 the lower end of which bar rests on a rearward extension of a treadle 27. As these bars, of which there are two, (one for each of the two shoe clamping mechanisms) are eccentric to the center of rotation of the revolving table, only one can contact at a time with the treadle. (See Fig. 3.)

The toe of the shoe is supported on a pad 28 mounted on a vertically adjustable bar 29 which may be raised or lowered by a hand nut 30. The bar is fitted in a bearing forming part of the revolving jack table 1.

A toe guard 31 carried on a bracket 32 is provided for the purpose of preventing the breaking down of the sole at the toe where the leather overhangs the last.

40 is the leveling roller made of suitable shape. It is mounted on a pin 41 carried by a yoke 42 secured to the free end of an arm 43, whose other end is pivoted on a pin 44. The arm carries a block 46 fitting between cheeks 47 on a trunk 48, which block and cheeks serve to take the side strains when the roller is operating at an angle to the plane of the sole.

Pressure is put upon the roll 40 by one or more springs 51 carried on a fitting 52 adjustably mounted on the trunk 48. The spring or springs bear at their forward end on a fitting which has a ball shaped projection engaged with a suitable fitting on a bar 53 passing through the arm 43.

The trunk 48 is supported on bearings 49 of a sliding carriage 50 in such a manner that the trunk may slide longitudinally to a small extent and may be rocked or partly rotated relatively to the carriage for the purpose hereinafter made evident.

The carriage 50 is intended to move longitudinally forward and backward the leveling roller being thereby made to travel completely along the sole and during such bodily forward and backward movement of the carriage and leveling roller the latter is intended to also have short vibratory movements whereby a better leveling and polishing or smoothing of the sole is to be attained. For the purpose of imparting such vibratory movements to the leveling roller I provide the carriage 50 with a bearing 56 in which a vertical shaft 55 is carried the upper end of which shaft is provided with a crank pin 64—which may be provided with a collar—entering and fitting between segmental flanges or cheeks 45 formed around the lower half of the trunk 48, a fairly rapid rotation of the shaft 55, acting through the crank pin 64, imparting short vibratory movements to the trunk 48 and consequently to the roller 40.

Rotary motion is imparted to the shaft 55 from a driving pulley 61 through bevel gears 57 one of which is fixed to said shaft and the other on a shaft 58. The shaft 58 is carried at one end in a bearing 59 on the carriage 50 and is made to travel in a horizontal direction with the carriage by reason of the boss of its bevel wheel 57 being on one side and a collar 62 fixed to it at the other side of the bearing 59. The other end of the shaft 58 is passed through the sleeve-like boss of the driving pulley 61 (which is supported in a bracket or bearing 60 secured to the main frame) and said shaft is formed with a key-way in which a key 63, secured to the driving pulley, enters to impart rotary while permitting longitudinal movement of the shaft 58.

The mechanism for bringing about the forward and backward travel of the carriage 50 will now be described. It comprises a worm 70 (Fig. 5), fixed on or forming part of the shaft 55 and which gears with two worm wheels 71 mounted on studs 72 secured in the extension on the underside of the main carriage. The worm wheels are prevented from moving endwise on the studs 72 by a frame (not shown) fitting over their bosses. The bosses are provided with clutch teeth on their faces, and pinions 73 having corresponding clutch teeth are also carried by said studs. These pinions are arranged to gear into a rack 74 fixed on the main frame and both said gears are always in engagement with it. It will be evident that rotation of the worm 70 will drive both worm wheels, one being revolved in one direction and the other in the opposite. The pinions 73 are movable endwise on their studs and this movement is controlled by a "switch" lever 75 pivoted to the main carriage and having forks entering grooves in the bosses of the pinions. This lever has a forward projection 76 adapted to engage with stops or dogs upon the stop rod to be presently described.

As shown in Fig. 8 the switch lever is tilted toward the left and the left hand pinion 73 is in gear with its relative worm wheel 71 so that a clockwise rotation of the worm 70 will move the carriage, trunk and roller to the left. Should the switch lever be made to tilt over to the other side the right hand pinion will be made to be operative and the carriage will be moved toward the right. When the carriage 50 is near the end of its backward or return movement (i. e. toward the left in the drawings) the projection 76 (indicated by c in Figs. 10 and 11) will pass over and depress a spring pawl 123ª and then contact with a spring operated lever 120. The spring operating said lever is strong enough to normally tilt the switch lever to its extreme forward position but owing to the momentum the switch lever will press back the lever 120 until the latter comes in contact with a stop 121. A slight further movement of the carriage causes the switch lever to be moved to its central position (with both pinions 73 out of engagement with the rack 74) being prevented from being moved to its extreme forward position by the spring pawl 123ª thus bringing the machine to rest to enable the adjustment of a boot or shoe to be effected or completed. To again start the machine the operator depresses a treadle (not shown) which, acting through a chain or equivalent, moves a spring operated lever 122 on which the pawl 123 is carried and withdraws the latter from its obstructing position in front of the switch lever permitting the spring catch 120 to act to move said lever and bring the right hand or forward pinion 73 into gear with the rack 74.

The extent of forward travel of the carriage is limited by a catch or abutment 123 which is shown pivotally mounted in a slot on the shaft 124 and which serves to reverse the switch lever as the latter is moved against it. The position of the stop or abutment 123 determines the total length of travel of the carriage and roller and this position must be adjusted according to the length of the boots or shoes to be operated on. The means for doing this will be described hereinafter.

While I do not restrict myself to the particular means to be described for automatically controlling the leveling roller during the operation of the machine so that the several results hereinbefore set out may be attained, I will now proceed to describe, with reference to the accompanying drawings, means for the purpose of carrying out this part of my invention.

An upright shaft 77 carried at the rear part of the carriage 50 is provided at its upper end with a crank disk 77ª having a crank pin 78 projecting upward. This pin engages in a cylindrical block 79 which slidably fits in a correspondingly shaped recess at the rear end and eccentric to the longitudinal axis of the trunk 48 so that by rotating the shaft 77 the crank pin 78 will cause the trunk to be rocked or partly rotated on its longitudinal axis. In Fig. 5 the crank pin is at its extreme right hand or forward position and in this position the trunk is held with the axis of the leveling roller horizontal. If now the shaft 77 be rotated clockwise through an angle of 90° the trunk will be rotated on its axis and the leveling roller tilted with its left end lowermost and to the full extent within the capacity of the crank pin. If next the shaft 77 be rotated through a further angle of 90° the roller will have been brought back to its horizontal position, the next quarter turn of the shaft tilting the roller to its extreme right hand position and the last quarter turn will bring the parts back to their original positions. It will be seen that this tilting can be effected while the crank pin 64 imparts the bodily vibrations, already described, to the trunk.

The lower end of the shaft 77 is provided with a spiral gear 90 to which a disk 87 is fixed the said gear and disk being capable of rotating on the shaft 77 without imparting rotary movement thereto. A continuous rotary motion is imparted to the gear 90 from the worm 70 (see Fig. 6) by a worm wheel 88 and gear 89 mounted on a spindle 88ª. The disk 87 is made with radial slots 86 for the purpose to be hereinafter described.

Fixed to the shaft 77 is a disk or cylindrical block 80 (which block and other parts of the mechanism now about to be described are shown detached and on an enlarged scale in Figs. 16 to 23) formed with a recess 81 in which a lever 82 is fitted. The said lever is carried on a pivot 83 and is provided near its free end and at one side thereof with pins 84ª on which rollers 84 are carried, the dimensions of said rollers being such that one or the other must project either above or below the block 80.

Mounted on the circumferential flange 80ᶜ with which the cylindrical block 80 is formed I provide a ring 91 provided with four pins 92 spaced equally apart. The ring is adapted to be rotated relatively to the block 80, and one of the pins 92 is formed with an extension 92ª passing through a slot 80ª in the ring and connected to a lug 80ᵇ on the block 80 by a spring 95ª which spring tends to always retain the ring 91 in the position shown in plan in Fig. 17 viz., with its extension 92ª against one side of the slot 80ª.

The ring 91 is formed at one part with inclined grooves 91ª in which the pins 84ª engage the engagement being such that if the parts be in the position shown in Figs. 16 and 17, the pins 84ª and rollers 84 will be held raised with the upper one of the rollers 84 projecting above the top surface of the block 80. Should now the ring 91 be rotated relatively to the block 80 the grooves 91ª will cause the pins 84ª and rollers 84 to be depressed so that the lower roller will be made to project below the bottom surface of the block 80.

The lower surface of the carriage 50 at the part where the shaft 77, block 80 and ring 91 are applied is formed with four slots 85 spaced equally apart and radiating from the axis on which the shaft rotates, said slots being similar to the slots in the disk 87. It will be seen that accordingly as the ring 91 is at one or other end of its path of movement relatively to the disk 80 the said disk will be coupled either with one of the slots 85 or one of the slots 86. In the former case the disk 80 will be prevented from rotating—being coupled with the carriage—but in the latter case the block 80—being coupled with the disk 87—will be made to rotate therewith thereby rotating the shaft 77 and crank pin 78. It will also be seen that if the upper roller 84 is in engagement with one of the slots 85 the parts cannot be disengaged until one of the slots 86 of the disk 87 is under the lower roller 84 and vice versa.

The movement of the lever 82 whereby the rollers 84 are alternately made to engage in the slots 85, 86, is normally to be effected automatically. For this purpose I provide a lever 94 carried by a vertical pin 95 which is supported at the rear end of the carriage 50 and which lever carries a pawl 93 made preferably in the form of a spring plunger and having one side of its projecting end beveled, the arrangement being such that the pawl may be depressed so that its end may be substantially flush with its housing.

The parts are arranged in such a position that the pawl may engage with the pins 92 (Fig. 8) and by imparting a rocking movement to the lever 94 in one direction the pawl 93 acting on the pin 92 will partially rotate the ring 91 relatively to the block 80. Inasmuch however as the ring 91 may not be capable at that moment of being moved by reason of a groove 86 not being immediately under the roller 84, the pressure exerted by the pawl must be a yielding pressure and for this purpose I provide a lever 96 also mounted on the shaft 95 (to which lever the necessary rocking movements are imparted by means to be described) and to which the lever 94 is connected by a spring 97 one end of which is connected to a pin 96$^a$ on the lever 96 and the other end of which spring is connected to a pin 94$^a$ on the lever 94 said pin passing through a slot in the lever 96. For the purpose of rocking the lever 96 I provide a lever 99 mounted on a spindle 100 on the carriage 50 which engages by a pin 101 with a slot in the lever 96. The lever 99 is made with a depending arm from which projects a V-shaped lug 98 and on the shaft 124 carried at the side of the machine I provide two abutments 130 and 131 which are in the path of movement of the lug 98 as the carriage travels forward. The lugs 130 and 131 may be carried by brackets or the like adjustably mounted on the shaft 124.

The operation of the parts is as follows:— Assuming a boot or shoe to be in position to be operated on and the carriage to be at its rearmost or starting position (that is at the extreme left of Fig. 7) with the crank pin 78 in the position there shown:—If now the machine be started the leveling roller will be made to vibrate and simultaneously slowly travel forward with the carriage 50. The leveling roller during this early period of its forward movement will be horizontal. (The roller is now operating on the sole at the forepart of the boot). When the lug 98 comes in contact with and moves up one side of the abutment 130 (which abutment has been fixed on the shaft 124 in the proper position having regard to the size of boot to be operated on) the lever 99 will be rocked and its pin 101 will in turn rock the lever 96. If at that moment there be one of the grooves 86 under the lower roller 84 the levers 96 and 94 will move as one and the pawl 93 will rotate the ring 91 and throw the lower roller into said groove 86 simultaneously disengaging the upper roller from the groove 85. The block 80 and shaft 77 will now be made to rotate with the disk 87 thereby causing the crank pin 78 to tilt the roller to one side as already described. This rotary movement of the parts will continue until the upper roller is brought into position immediately under the next succeeding groove 85 when the spring 95 connecting the block 80 and ring 91 will instantly operate causing the said ring to rotate backward relatively to the block 80 and thereby uncouple the disk 80 from the rotating disk 87 and couple it with said groove 85. The disengagement of the roller 84 from one groove 85 and its engagement with the next succeeding groove 85 necessitates the rotation of the disk 87 through an angle of 90° and consequently the crank pin 78 will also have been moved through an angle 90° thereby rocking the trunk 48 on its axis and tilting the leveling roller to the full extent within the capacity of the particular means. The crank pin 78 will hold the leveling roller tilted until the lug 98 comes in contact with the second abutment 131 when the levers 99, 96, and 94 will be again operated in the manner described causing the crank pin to be rotated a further quarter revolution bringing the roller horizontal again. The position of the abutment 131 on the shaft 124 relatively to the stop 123 is to be such that it will operate to effect the turning of the roller to its horizontal position at the same moment that the reversing in the travel of the carriage is effected.

It will be understood from the foregoing that should the grooves 85 or 86 not be in a position to permit the transference or movement of the rollers 84 in the manner described at the instant when the lug 98 contacts with either of the abutments 130 or 131 the spring 97 will be merely extended so that so soon as the said grooves are in proper position the said spring will immediately operate to effect the said transference. In order that a groove 86 may be brought under the roller 84 almost instantly after the operation of the ring 91 I may form the rotating disk with eight (more or less) radial grooves whereas there are only four grooves 85 in the carriage. By the foregoing means alternate right and left boots of that kind in which one side only of the waist is made at an angle are automatically leveled.

In order to enable boots to be leveled in which both sides of the waist are to be acted on with the leveling roller tilted I provide the rearmost slot or groove 85 (i. e. the groove at the extreme left of Fig. 5) with a screw 103 or equivalent of a diameter or thickness about equal to the width of the groove and by adjusting said screw or equivalent so that its lower end is flush with the lower surface of the carriage at that part of the upper roller 84 will be prevented entering said groove so that when the lug 98 contacts with the abutment 131 and the block 80 and spindle 77 are connected with the rotating disk 87 the crank pin 78 will be made to rotate through a half revolution (instead of one quarter) thus bringing the leveling from the extreme tilt at one side to the extreme tilt on the other side of the waist of the boot or shoe.

When the one side only of the waist of the boot or shoe has to be operated on with the leveling roller tilted, the abutment 130 must be inoperative during the return journey of the lug 98 as the leveling roller is horizontal and would otherwise be tilted by contact with said abutment. For this purpose I pivot the abutment on a pin 133 carried by a bracket adjustable on the shaft 124 on which pin it will rotate at such time, the abutment being normally held against a flange or the like 133ᵃ by a spring. When both sides of the waist are to be operated on with the leveling roller inclined the abutment must operate in both directions of movement of the lug 98 and to enable this to be done I provide the abutment 130 with a set screw 132 the tightening up of which will rigidly connect said abutment to its supporting bracket.

The abutments 130, 131 and 123 must be adjustable to adapt the machine for boots and shoes of different sizes and for this purpose I mount said abutments on the shaft 124 which is slidably carried in suitable supports on one side of the machine. I also provide a lever 125 one end of which is provided with a pivoted nut engaged by the screw threaded end of a rod 126 whose outer end is provided with a handwheel 127. The upper end of the lever 125 is linked to a bracket or the like fixed to the shaft 124 by set screws so that the rotation of the handwheel 127 will move the shaft 124 and the several abutments carried thereby. The abutment 123 determines the length of travel of the carriage 50 and as this should correspond to the size of boot to be leveled I provide the lever 125 with a segment 128 on which a suitable scale may be marked and I provide a pointer or indicator 129 so as to enable the proper adjustment of the parts to be easily and correctly effected.

The abutment 131 determines the tilting of the roller at the end of its travel and consequently said abutment will occupy a constant position relatively to the abutment 123 as these abutments must operate simultaneously. The abutment 130 which determines the initial and in some cases also final tilting of the roller is adjustable on the shaft 124 as its position relatively to the abutment 131 must vary according to the size of boot to be leveled.

For the purpose of adapting the machine to level boots or shoes in which neither side of the waist is to be operated on with the leveling roller tilted I provide the lever 96 with an arm 102 and connect this by a chain or otherwise to a treadle (not shown) the depression of which will swing said lever and the pawl 93 and by retaining said treadle in its depressed position by a catch or otherwise the pawl will be rendered inoperative. Care must be taken that the depression of the said treadle for this purpose is effected when the roller is horizontal as otherwise the roller will be maintained in a tilted position until the parts are released. Instead of a treadle other means such as a hand lever might be employed. In addition to enabling the tilting mechanism to be thrown out of operation the means described are also useful in that they permit the operator at any time during the operation of the machine to alter or change the direction of the inclination of the roller. This may be done by actuating the levers 94, 96 by means of the arm 102 to cause the pawl 93 to bring about a change in the position of the rollers 84, as hereinbefore described, the said arm being thereupon immediately released. The operator may thus accomplish at will (while the machine is in motion) what is automatically and at prescribed times effected by the abutment 130, lug 98, lever 99 and pin 101. This is useful in that when the operator is adjusting a boot or shoe—for example when first starting—he may find that while the boot he has adjusted is a left one the machine is set to level a right boot and by the means described he is enabled to change the direction of the subsequent tilt of the roller. Or it may be a number of rights or lefts may for some reason have to be leveled successively and to avoid waste of time he can in the manner described insure the roller acting as required in successive operations. Although in the ordinary use of the machine the mechanism controlling the tilting of the roller will be automatic in its action, it will be seen that the operator has complete control over said mechanism which control is quite independent of the means whereby automatic adjustment is effected.

For the purpose of rotating the jack carrying table at any time desired by the operator to move a jack into position so that a boot carried thereby may be operated on by the leveling roller I provide mechanism to be operated by a constantly moving part of the machine and which mechanism is coupled to said moving part by the operator momentarily actuating a treadle or equivalent the rotation of the table continuing until a jack has been carried into proper position relatively to the leveling roller. As a means for effecting this I may employ the mechanism now to be described.

On the trunk of the table 1 I fix a crown wheel 135 which is engaged by a pinion 136 mounted at one end of a shaft 137 carried in bearing on the main frame and located under the table. The other end of said shaft carries a friction disk 138 which forms one member of a friction coupling whereby the required rotary movement is to be imparted to the table. Adjacent to and in axial alinement with the shaft 137 I provide a similar and also suitably supported shaft 140 which carries the other member, 139, of the friction coupling and which shaft in addition to rotary movement is capable of having slight longitudinal movement imparted to it for the purpose of putting the disks 138, 139, into or out of engagement. The shaft 140 is constantly rotated and for this purpose may be provided with a driving pulley 141 deriving motion from any convenient source. Mounted on the shaft 140 but not to rotate therewith and confined between the boss of the disk 139 and a collar 144 is a sleeve 142 which is formed at one side with gear teeth and closely adjacent to said sleeve I provide a vertical shaft 143 having similar teeth formed at one part to engage the teeth in the sleeve 142. The shaft 143 is capable of rotary as well as longitudinal movement in its bearings and I provide a spring 147 which serves both to raise said shaft and normally hold it in its raised position and to rotate it in a direction that its gear teeth acting on those of the sleeve 142 will force the disk 139 against the disk 138. The upper end of the shaft 143 is provided with a hook 145$^a$ adapted to engage with a stud or any one of a series of studs 145 fixed to the underside of the table 1. There is one such stud for each jack carried by the table and it or they are so positioned that when engaged (as shown in Figs. 14 and 15) by the hook 145$^a$ the relative jack will be in proper position for the leveling roller to act on a boot thereon and the disk 139 will be held out of engagement with the disk 138. The free end of the hook 145$^a$ is formed with a cam surface and the lower end of the shaft 143 is connected by a chain 146 or equivalent to a treadle or other suitable operating means. If by momentarily depressing a treadle or by any other suitable means the operator mementarily pulls on the chain 146, the shaft 143 will be pulled down by it causing its hook 145$^a$ to move from off the stud 145 thereby releasing the table, and simultaneously the spring 147 will rotate the shaft 143 to cause the disk 139 to engage the disk 138 to rotate the table. This position of the parts and consequent rotation of the table will be maintained until the next stud 145 on the table 1 is brought around when said stud acting on the cam surface of the hook 145$^a$ will push the hook back so that the stud may be engaged by the hook and the movement of said hook will simultaneously throw the disk 139 out of engagement with the disk 138.

It will be understood that if desired the machine may have two or more leveling rollers such as described to enable two or more operatives to work simultaneously on the same machine.

What I claim as my invention and desire to secure by Letters Patent is:—

1. A sole leveling machine comprising a single vibrating leveling roller, a plurality of shoe-supporting jacks, means operated by the machine at the will of the operator whereby the jacks are successively moved into and out of position to present alternately a right and a left shoe to be operated on by the said roller, and automatically operating means adjustable by the operator for tilting the roller at the proper time to one side in operating on the shank portion of a right shoe and to the other side in operating on the shank portion of a left shoe.

2. A sole leveling machine having a single leveling roller, a plurality of shoe-supporting jacks, means whereby the jacks are successively moved into and out of position to present the boot or shoe to be operated on by said roller, and automatically operating roller-controlling means adjustable by the operator to determine whether and when the said roller shall be made to tilt during the next succeeding operation of the machine.

3. A roll leveling machine having a single leveling roller, a plurality of shoe-supporting jacks means whereby said jacks may be successively moved into and out of position to present the boot or shoe to be operated on by said roller, means to impart to said roller a movement first in one direction and then in the opposite direction longitudinally of said boot or shoe, and automatically operating roller-controlling means adjustable by the operator to determine whether and when the said roller shall be made to tilt during its movement in the one direction and whether and when said roller shall be made to tilt during its movement in the opposite direction longitudinally of the boot or shoe.

4. A sole leveling machine having a leveling roller, a jack to support the boot or shoe, means to impart to the roller and the jack movements relatively to each other in the direction longitudinally of the boot or shoe, means to tilt the roller, means whereby the machine automatically sets in operation the means to tilt the roller, and means whereby the operator may set in operation the said means to tilt the roller independently of said automatic means.

5. A sole leveling machine having a leveling roller, a jack to support the boot or shoe, means to impart to the roller and the jack movements relatively to each other in the direction longitudinally of the boot or shoe, means to tilt the roller, means adjustable by the operator whereby the machine automatically sets in operation the means to tilt the roller and means under the control of the operator whereby to set in operation the said means to tilt the roller independently of said automatic means.

6. In a sole leveling machine, the combination of a leveling roller, a trunk on which an arm carrying the said roller is pivotally supported, a carriage on which the said trunk is mounted so that said trunk can slide longitudinally to a small extent and be rocked relatively to the said carriage, means for moving the said carriage forward and backward to cause the leveling roller to travel from end to end of its path of operation, means for reciprocating the said trunk to impart short vibratory movements to the said roller independently of the aforesaid movements imparted by the carriage, means for rocking the trunk to tilt the leveling roller to one side or the other, and automatically operating roller-controlling means adjustable by the operator to determine wherether and when the said roller shall be made to tilt during the next succeeding operation of the machine.

In testimony whereof I have signed my name to this specification in the presence of two subscribing witnesses.

MARK THOMAS DENNE.

Witnesses:
 WALTER W. BALL,
 F. HOOD.

Copies of this patent may be obtained for five cents each, by addressing the "Commissioner of Patents, Washington, D. C."